United States Patent
Hirooka (10) Patent No.: US 7,924,451 B2
(45) Date of Patent: Apr. 12, 2011

(54) CLIENT SERVER SYSTEM

(75) Inventor: Satoshi Hirooka, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 1111 days.

(21) Appl. No.: 11/432,520

(22) Filed: May 12, 2006

(65) Prior Publication Data

US 2006/0256376 A1    Nov. 16, 2006

(30) Foreign Application Priority Data

May 16, 2005    (JP) ................................. 2005-142360

(51) Int. Cl.
- *G06F 3/12*     (2006.01)
- *G06F 15/16*    (2006.01)
- *H04N 7/18*     (2006.01)
- *H04N 7/173*    (2011.01)

(52) U.S. Cl. ............. 358/1.15; 725/81; 725/87; 725/93; 725/95; 725/97; 725/116; 725/126; 709/219; 709/246

(58) Field of Classification Search ................. 358/1.15; 725/81, 87, 93, 95, 97, 116, 126; 709/219, 709/246

See application file for complete search history.

(56) References Cited

U.S. PATENT DOCUMENTS

| | | | | |
|---|---|---|---|---|
| 5,764,235 A * | 6/1998 | Hunt et al. | ..................... | 345/428 |
| 5,983,263 A * | 11/1999 | Rothrock et al. | ............. | 709/204 |
| 6,014,712 A * | 1/2000 | Islam et al. | ................... | 709/246 |
| 6,088,051 A * | 7/2000 | Barraud | ......................... | 725/116 |
| 6,594,699 B1 * | 7/2003 | Sahai et al. | ................... | 709/228 |
| 6,675,210 B1 * | 1/2004 | Takeo et al. | ................... | 709/224 |
| 6,898,800 B2 * | 5/2005 | Son et al. | ......................... | 725/93 |
| 7,617,513 B2 * | 11/2009 | McCafferty et al. | ............ | 725/81 |
| 2001/0021998 A1 * | 9/2001 | Margulis | ......................... | 725/81 |
| 2003/0061619 A1 * | 3/2003 | Giammaressi | .................. | 725/95 |
| 2003/0096581 A1 * | 5/2003 | Takamine | ....................... | 455/84 |
| 2003/0174243 A1 * | 9/2003 | Arbeiter et al. | ............ | 348/384.1 |
| 2004/0073873 A1 * | 4/2004 | Croney et al. | ................. | 715/526 |
| 2004/0133701 A1 * | 7/2004 | Karaoguz et al. | ............. | 709/246 |
| 2004/0194143 A1 * | 9/2004 | Hirose | ............................. | 725/97 |
| 2005/0091693 A1 * | 4/2005 | Amine et al. | ................. | 725/100 |

(Continued)

FOREIGN PATENT DOCUMENTS

JP     10-171730 A    6/1998

(Continued)

OTHER PUBLICATIONS

Japanese Office Action dated Sep. 26, 2007 with English translation (Six (6) pages).

Primary Examiner — King Y Poon
Assistant Examiner — Vincent R Peren
(74) Attorney, Agent, or Firm — Crowell & Moring LLP (57) ABSTRACT

A client server system S includes a plurality of client terminal devices 3 capable to connect with display device 4, whose screen resolution is HD or SD, and a server device which provides image information to the plurality of client terminal devices s through wireless network N. The server device 1 is structured to include a sendable resolution determining program 1134 to make CPU 111 determine whether to convert HD image information into SD image information or not, and an image information sending program 1135 to make the CPU 111 send SD image information attached with SD information to the plurality of client terminal devices 3.

3 Claims, 6 Drawing Sheets

U.S. PATENT DOCUMENTS

| | | | |
|---|---|---|---|
| 2006/0031889 A1* | 2/2006 | Bennett et al. | 725/80 |
| 2006/0080707 A1* | 4/2006 | Laksono | 725/38 |
| 2006/0117371 A1* | 6/2006 | Margulis | 725/131 |
| 2006/0238648 A1* | 10/2006 | Wogsberg | 348/441 |
| 2009/0007199 A1* | 1/2009 | La Joie | 725/95 |

FOREIGN PATENT DOCUMENTS

| | | |
|---|---|---|
| JP | 10-326169 A | 12/1998 |
| JP | 2005-39515 A | 2/2005 |

* cited by examiner

| CLIENT IDENTIFICATION NUMBER *1131a* | SCREEN RESOLUTION *1131b* | IMAGE IDENTIFICATION NUMBER *1131c* |
|---|---|---|
| 01 | HD | 28 |
| 04 | SD | 26 |
| 08 | SD | 28 |
| 13 | HD | 28 |
| 15 | HD | 28 |

CLIENT SERVER SYSTEM

BACKGROUND OF THE INVENTION

1. Field of the Invention

The present invention relates to a client server system.

2. Description of the Related Art

Recently, a system that sends and provides image information (contents information) from a server device to a client terminal device them through a network is utilized. To the server device, a plurality of types of image apparatuses such as a television device, a video recorder, a personal video recorder (PVR), a tuner for broadcasting satellite (BS) and communication satellite (CS), a set top box (STB), a digital versatile disk (DVD) player, and the like, are connected for example. The server device is capable to send image information corresponding to the image apparatus connected to the server device, to the client terminal device.

In case resolution of the image information sent from the server device is different from a screen resolution of a display device connected to the client terminal device, the resolution of the image information is adjusted to the screen resolution of the display device by a scaling function of the display device. However, method relying on the scaling function of the display device has a problem. For example, size of an image displayed on the display device becomes smaller than the screen size of the display device once, and then becomes aligned to the screen size of the display device, thus a person observing the display device have an uncomfortable feeling.

In particular, for example, in case the resolution of the image information changes while sending the image information, in other words, in case an image information sending rate decreases even though the server device has sent to the client terminal device an image information with high definition (HD) image information, or in case sending an image information of standard definition (SD) image information becomes necessary due to an increase in number of client terminal device to which the image information is sent, the size of an image displayed in the display device becomes unmatched with the screen size of the display device in midcourse, thus causing a person observing the display device have an uncomfortable feeling.

Therefore, without relying on the scaling function of the display device, a method to adjust the resolution of the image information sent from the server device to the screen resolution of the display device at the client terminal device, before the image information is imputed to the display device, is disclosed in Japanese Laid-open Patent Specification No. 10-326169 and Japanese Laid-open Patent Specification No. 10-171730 (hereinafter referred to as patent documents 1 and 2 respectively).

However, in the aforementioned patent documents 1 and 2, the resolution of the image information sent from the server device is uniform regardless to the screen resolution of the display device connected to the client terminal device. That is, the server device sends SD image information even to the client terminal device connected with a display device with screen resolution of HD, for example. Therefore, a problem arises in that even though the client terminal device displays on the display device with screen resolution of HD, the SD image information converted into HD image information, image quality is degraded compared to a case when HD image information sent from the server device is displayed as it is. In order to solve this problem, a method in which the server device selects the resolution of the image information that is to be sent according to the screen resolution of the display device, can be mentioned. However, in such method, the server device needs to have a structure that can send HD image information and SD image information individually in accordance with the screen resolution of each display device, and results in high cost.

In addition, in the aforementioned patent documents 1 and 2, the client terminal device always checks the resolution of the image information sent from the server device. Therefore, the check is conducted even when image information having the same resolution as the screen resolution of the display device, and the image information can be displayed directly in the display device. Thus, it is not efficient.

SUMMARY

An object of the present invention is to provide a client server system that can more easily send image information corresponding to the screen resolution of the display device connected to the client terminal device from the server device, and can display the image information in the display device without causing a user have an uncomfortable feeling.

According to the first aspect of the present invention, a client server system comprises a server device which provides image information to a plurality of client terminal devices through wireless network, further comprising: a storage section to store a screen resolution of display devices connected to the plurality of client terminal devices in association with identification information to identify the plurality of client terminal devices; a storage control section to store the screen resolution and the identification information sent from the plurality of client terminal devices in the storage section with association with each other; a receiving section to receive the identification information of the plurality of client terminal devices along with a request to send the same image information and from at least one of the plurality of client terminal devices; an obtaining section to obtain first image information of a first resolution corresponding to the request to send image information received at the receiving section; a determining section to determine whether there is a client terminal device which connects a display device with a second resolution, among the at least one of the plurality of client terminal devices that were received by the receiving section, according to the identification information of the at least one of the plurality of client terminal device received by the receiving section and the identification information stored in the storage section; a server resolution conversion section to convert the first image information of the first resolution obtained by the obtaining section, into second image information of the second resolution, in case it is determined that there is a client terminal device which connects a display device with the second resolution, among the at least one of the plurality of client terminal devices that were received by the receiving section according to the determining section; and an image information sending section to attach resolution information, that indicates that the resolution of the second image information is the second resolution, to the second image information of the second resolution that was converted by the server resolution conversion section, and to send it to the at least one of the plurality of client terminal devices, and the plurality of client terminal devices further comprising: a setting section to set a screen resolution of the display devices connected to the plurality of client terminal devices; a screen resolution sending section to send the screen resolution set by the setting section and identification information of the plurality of client terminal devices to the server device; a client resolution conversion section to convert the second image information attached with the resolution information that was sent from the image information sending section, so as to comply with the screen resolution of the display device connected to the plurality of client terminal devices, according to the resolution information; and a display control section to display an image information converted by the client resolution conversion section on the display device, wherein the plurality of client terminal devices are capable to connect with a first display device with screen resolution of the first resolution, or the second display device with screen resolution of the second resolution, which has lower resolution than the first resolution.

According to this invention, the screen resolution of the display device connected to the client terminal device can be stored in association with identification information to identify the client terminal device by the storage section. In addition, it can be determined whether there is a client terminal device which connects a display device with a screen resolution of second resolution, among the client terminal device accepted by the receiving section, according to the identification information of the client terminal device accepted by the receiving section and the identification information stored in the storage section, by the determining section. Further, in case it is determined that there is a client terminal device which connects a display device with the screen resolution of the second resolution among the client terminal device accepted by the receiving section by the determining section, the image information of the first resolution obtained by the obtaining section can be converted into image information of the second resolution, by the server resolution conversion section.

That is, the server device can determine the resolution of the image information which is to be sent to the client terminal device, within taking into account the screen resolution of the display device connected to the client terminal device. Meantime, the resolution conversion section provided at the server device is only the server resolution conversion section that converts the image information of the first resolution into image information of the second resolution. Therefore, the decrease in image quality displayed I the display device can be kept to minimum, and the cost of the server device can be suppressed.

In addition, by the image information sending section, the resolution information, which indicates that the resolution of the image information is the second resolution, can be attached to the image information of the second resolution converted by the server resolution conversion section. Therefore, the image information of the second resolution, attached with the resolution information can be sent to the client terminal device accepted by the receiving section. Thus the client resolution conversion section can convert the image information of the second resolution, attached with the resolution information, so as to comply with the screen resolution of the display device connected to the client terminal device, according to the resolution information.

Therefore, the client terminal device does not have to check the resolution of the image information sent from the server device, thus excellent efficiency is achieved.

In addition, since the resolution of the image information sent from the server device can be adjusted to the screen resolution of the display device at the client terminal device before the image information is inputted to the display device, a person observing the display device would not have an uncomfortable feeling.

Further, the screen resolution that is set by the setting section and the identification information of the client terminal device can be sent to the server device, by the screen resolution sending section. The screen resolution and the identification information sent from the screen resolution sending section can be stored in the storage section in association with each other by the storage control section.

Therefore, since the server device can take hold of the screen resolution of the display device connected to the client terminal device as needed, the screen resolution of the display device connected to the client terminal device can be taken into account appropriately.

According to the second aspect of the present invention, A client server system comprises a server device which provides image information to a plurality of client terminal devices through wireless network, further comprising: a receiving section to receive the identification information of the plurality of client terminal devices along with a request to send the same image information and from at least one of the plurality of client terminal devices; an obtaining section to obtain first image information of a first resolution corresponding to the request to send image information received at the receiving section; a second determining section to determine whether the first image information of the first resolution obtained by the obtaining section should be converted into second image information of the second resolution; a server resolution conversion section to convert the first image information of the first resolution obtained by the obtaining section, into second image information of the second resolution, in case it is determined that the first image information of the first resolution obtained by the obtaining section should be converted into second image information of the second resolution according to the second determining section; and an image information sending section to attach resolution information, that indicates that the resolution of the second image information is the second resolution, to the second image information of the second resolution that was converted by the server resolution conversion section, and to send it to the at least one of the plurality of client terminal devices, and the plurality of client terminal devices further comprising: a client resolution conversion section to convert the second image information attached with the resolution information that was sent from the image information sending section, so as to comply with the screen resolution of the display device connected to the plurality of client terminal devices, according to the resolution information; and a display control section to display an image information converted by the client resolution conversion section on the display device, wherein the plurality of client terminal devices are capable to connect with a first display device with screen resolution of the first resolution, or the second display device with screen resolution of the second resolution, which has lower resolution than the first resolution.

According to this invention, it can be determined whether the first image information of the first resolution obtained by the obtaining section should be converted into second image information of the second resolution in accordance with a predetermined condition by the second determining section; and the first image information of the first resolution obtained by the obtaining section can be converted into second image information of the second resolution, in case it is determined that the first image information of the first resolution obtained by the obtaining section should be converted into second image information of the second resolution according to the second determining section, by the server resolution conversion section.

That is, the server device can determine the resolution of the image information which is to be sent to the client terminal device, within taking into account the client terminal device. Meantime, the resolution conversion section provided at the server device is only the server resolution conversion section that converts the image information of the first resolution into image information of the second resolution. Therefore, the decrease in image quality displayed I the display device can be kept to minimum, and the cost of the server device can be suppressed.

In addition, by the image information sending section, the resolution information, which indicates that the resolution of the image information is the second resolution, can be attached to the image information of the second resolution converted by the server resolution conversion section. Therefore, the image information of the second resolution, attached with the resolution information can be sent to the client terminal device accepted by the receiving section. Thus the client resolution conversion section can convert the image information of the second resolution, attached with the resolution information, so as to comply with the screen resolution of the display device connected to the client terminal device, according to the resolution information.

Therefore, the client terminal device does not have to check the resolution of the image information sent from the server device, thus excellent efficiency is achieved.

In addition, since the resolution of the image information sent from the server device can be adjusted to the screen resolution of the display device at the client terminal device before the image information is inputted to the display device, a person observing the display device would not have an uncomfortable feeling.

Preferably, the client server system further comprises a storage section to store a screen resolution of display devices connected to the plurality of client terminal devices in association with identification information to identify the plurality of client terminal devices, wherein the second determining section: determines whether there is a client terminal device which connects a display device with screen resolution of a second resolution, among the at least one of the plurality of client terminal devices that were received by the receiving section, according to the identification information of the at least one of the plurality of client terminal device received by the receiving section and the identification information stored in the storage section; and determines that the first image information of the first resolution obtained by the obtaining section, should be converted into second image information of the second resolution, in case it is determined that there is a client terminal device which connects a display device with the second resolution, among the at least one of the plurality of client terminal devices that were received by the receiving section according to the determining section.

Therefore, the server device can determine the resolution of the image information which is to be sent to the client terminal device, within taking into account the screen resolution of the display device connected to the client terminal device.

BRIEF DESCRIPTION OF THE DRAWINGS

The present invention will become more fully understood from the detailed description given hereinbelow and the accompanying drawings which are given by way of illustration only, and thus are not intended as a definition of the limits of the present invention, and wherein.

DETAILED DESCRIPTION OF THE PREFERRED EMBODIMENT

An embodiment of the present invention will be described in detail hereinbelow with reference to figures. However, the scope of the invention shall not be limited to examples shown in figures.

<Structure>

First of all, structure of client server system, server device, and client terminal device is described.

[Structure of Client Server System]

Figure 1:
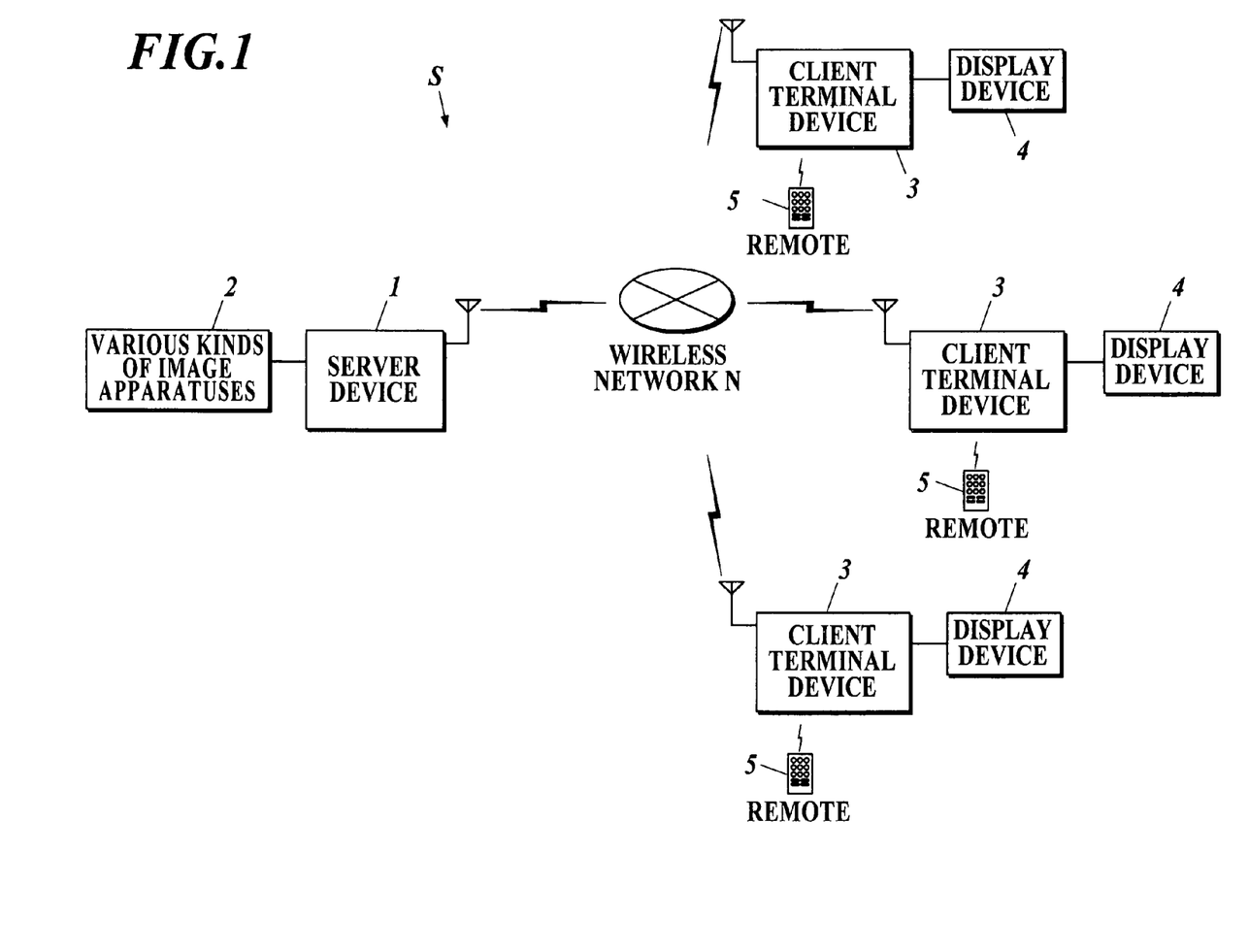
FIG. 1 is a view showing an entire structure of a client server system according to the embodiment of the present invention.

As shown in FIG. 1, client server system S is capable to connect with a server device 1 connected with various kinds of image apparatuses 2 and a display device 4, and is structured with a plurality of client terminal devices 3 that can be operated with remote controller 5 (hereinafter referred to as remote 5), and the like, for example. The server device 1 and the client terminal device 3 is connected through a wireless network N, and can send and receive information mutually.

Here, number of client terminal device 3 for the server device 1 is not limited to that in FIG. 1.

As for information sent from the client terminal device 3 to the server device 1, a request to send image information can be mentioned for example. The request to send image information is, for example, sent from the client terminal device 3 to the server device 1 in correspondence to a signal relating to the request to send image information, which is sent from remote 5 to the client terminal device 3 within depression of input button provided on the remote 5 by a user.

As for information sent from the server device 1 to the client terminal device 3, image information can be mentioned for example. The image information is, for example, obtained from the various kinds of image apparatuses 2 connected to the server device 1, and displayed on the display device 4 connected to the client terminal device 3.

In particular, for example, in case it is instructed to display image information desired by a user in the display device 4, by a signal relating to the request to send image information from the remote 5, the client terminal device 3 sends the request to send image information to the server device 1, in correspondence to the signal. The server device 1 that received the request to send image information obtains from the various kinds of image apparatuses 2, image information desired by the user that corresponds to the request to send image information, and sends it to the client terminal device 3. Subsequently, the client terminal device 3 displays the received image information in the display device 4. Thus, image information is provided from the server device 1 to the client terminal device 3.

Here, first resolution is defined as high definition (HD), and second resolution that has a lower resolution than the first resolution is defined as standard definition (SD), for example.

As for the display device 4, a first display device 4 that have screen resolution of the first resolution (high definition (HD))

and a second display device 4 that have screen resolution of the second resolution (standard definition (SD)) can be mentioned for example.

In addition, as for image information, image information (hereinafter referred to as HD image information) with the first resolution (high definition (HD)) and image information (hereinafter referred to as SD image information) with the second resolution (standard definition (SD)) can be mentioned for example. In the present invention, image information that server device 1 obtains from the various kinds of image apparatuses 2 are all HD image information. Further, image information sent from the server device 1 to the client terminal device 3 is HD image information or SD image information.

The wireless network N is, for example, a network such as wireless LAN (local area network) that meets the standards of Bluetooth standard, IEEE (institute of electrical and electronic engineers) 802.11 standard, or the like.

[Structure of Server Device]

Figure 2:
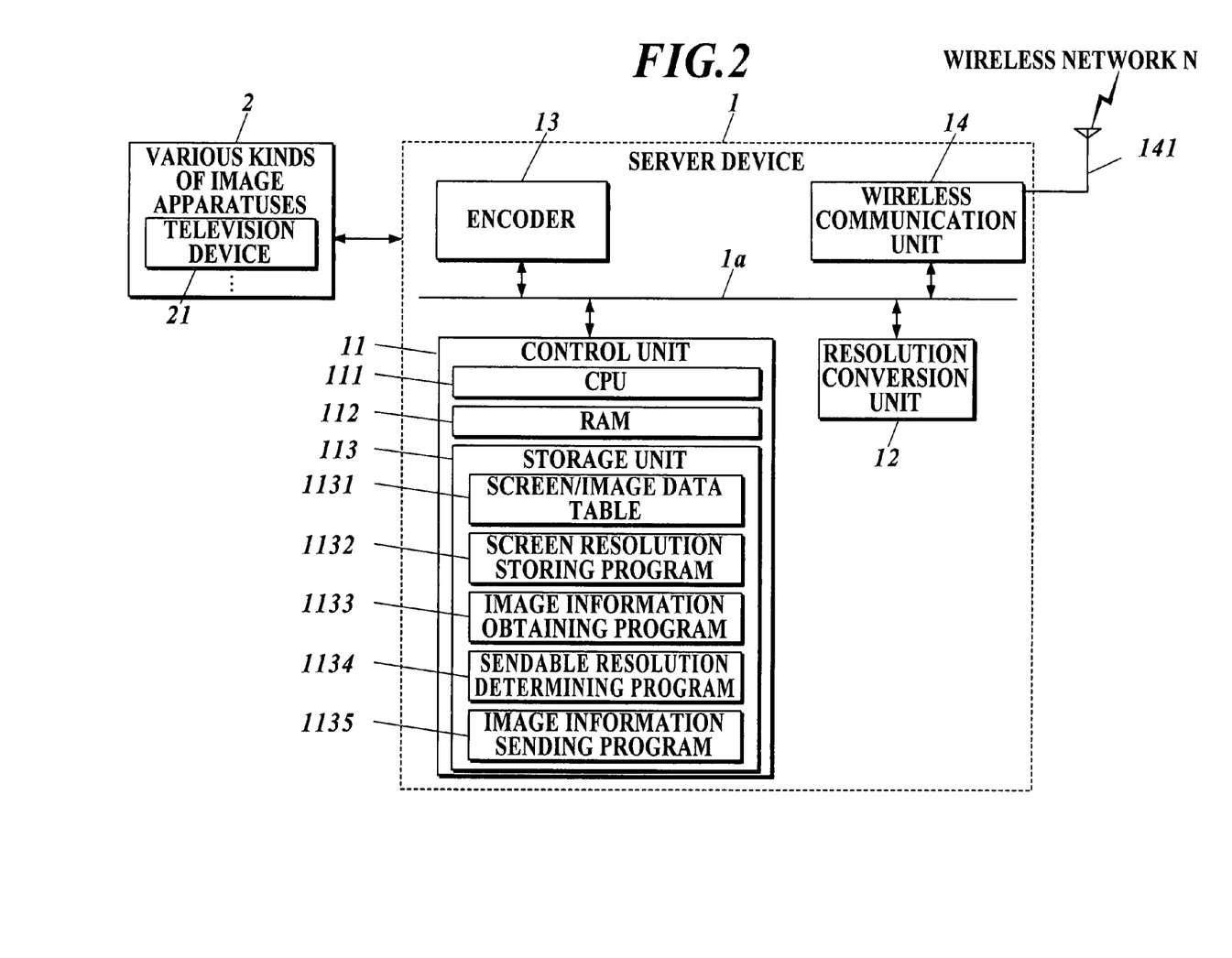
FIG. 2 is a block diagram showing a functional structure of a server device according to the embodiment of the present invention.

As shown in FIG. 2, the server device 1 is structured with a control unit 11, a resolution conversion unit 12 as a server resolution conversion section, an encoder 13, and a wireless communication unit 14 as a receiving section and an image information sending section, for example. Each unit is connected through a bus 1A. The server device 1 is connected with various kinds of image apparatuses 2.

As shown in FIG. 2, the control unit 11 includes CPU (central processing unit) 111, RAM (random access memory) 112, and a storage unit 113, for example.

The CPU 111 conducts various kinds of control operations according to various kinds of processing programs for the server device 1, stored in the storage unit 113.

The RAM 112 includes a program storage area to spread processing program executed by the CPU 111, and a data storage area to store inputted data and processing result generated when the aforementioned processing program is executed.

The storage unit 113 stores system program capable of being executed by the server device 1, various kinds of processing programs capable of being executed by the system program, data used when these various kinds of processing programs are executed, data of processing result obtained from arithmetic processing by the CPU 111, and the like. Here, the programs are stored in the storage unit 113 in a form of program code which is readable by the computer.

In particular, as shown in FIG. 2 for example, the storage unit 113 stores screen/image data table 1131 as a storage section, screen resolution storing program 1132, image information obtaining program 1133, sendable resolution determining program 1134, image information sending program 1135, and the like.

The screen/image data table 1131 stores screen resolution of the display device 4 connected to the client terminal device 3, in association with a client identification number as identification information to identify the client terminal device 3.

Figure 3:
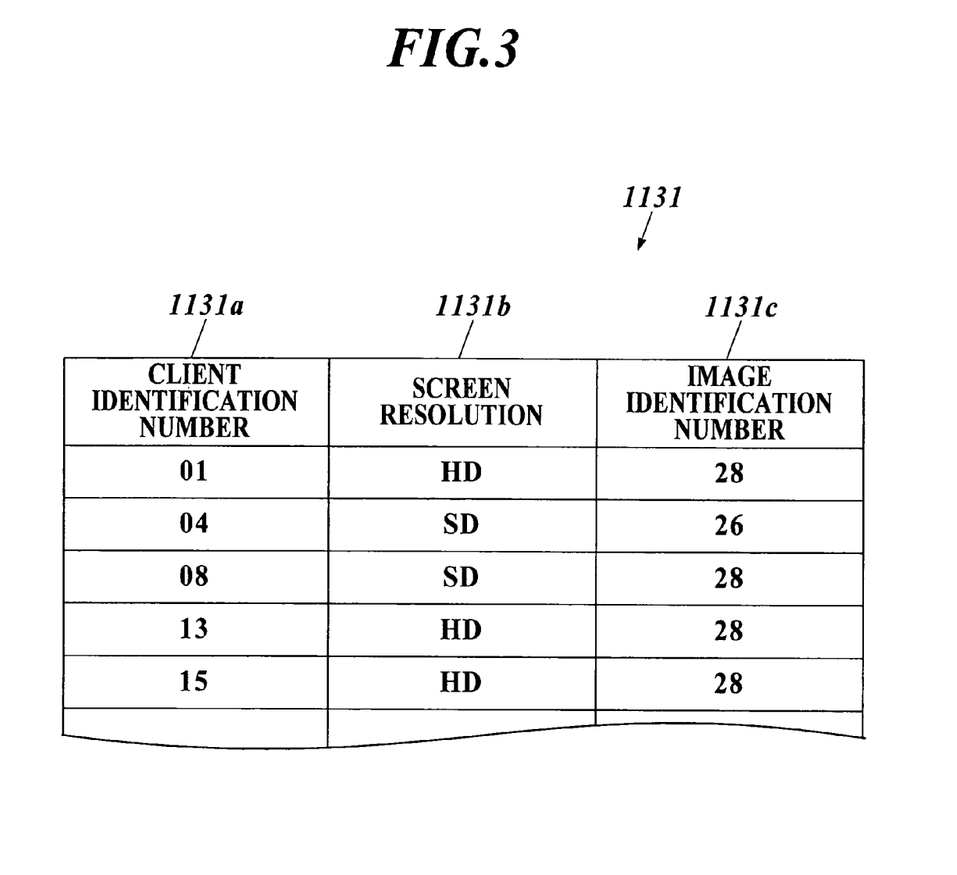
FIG. 3 is a view showing a data structure of screen image data table shown in FIG. 2.

In particular, as shown in FIG. 3 for example, the screen/image data table 1131 includes "client identification number" storing area 1131A, "screen resolution" storing area 1131B, "image identification number" storing area 1131C, and the like.

The "client identification number" storing area 1131A stores client identification number to identify the client terminal device 3.

The "screen resolution" storing area 1131B stores screen resolution of display device 4 connected to the client terminal device 3 which have the client identification number stored in the "client identification number" storing area 1131A.

The "image identification number" storing area 1131C stores image identification number to identify image information sent from the server device 1 to the client terminal device 3 which have the client identification number stored in the "client identification number" storing area 1131A.

The screen resolution storing program 1132 makes the CPU 111 actualize a performance to store screen resolution and the client identification number, that are sent from a wireless communication unit 32 (described later) as a screen resolution sending section of the client terminal device 3, in association with each other into the screen/image data table 1131.

In particular, for example, when the wireless communication unit 14 receives screen resolution of the display device connected to the client terminal device 3 and the client identification number of the client terminal device 3, that are sent from the wireless communication unit 32 (described later) of the client terminal device 3, the CPU 111 executes the screen resolution storing program 1132, and stores the screen resolution in association with the client identification number into the "screen resolution" storing area 1131B and "client identification number" storing area 1131A of the screen/image data table 1131.

The CPU 111 performs as a storage control section by executing the screen resolution storing program 1132.

The image information obtaining program 1133 makes the CPU 111 actualize a performance to obtain HD image information corresponding to the request to send image information, which is received by the wireless communication unit 14.

In particular, for example, when the wireless communication unit 14 receives the request to send image information from the wireless communication unit 32 (described later) of the client terminal device 3, the CPU 111 executes the image information obtaining program 1133 and obtains HD image information corresponding to the request to send image information, from the various kinds of image apparatuses 2.

The CPU 111 performs as obtaining section by executing the image information obtaining program 1133.

The sendable resolution determining program 1134 makes the CPU 111 actualize a performance to determine whether or not to convert HD image information, obtained by execution of the image information obtaining program 1133 by the CPU 111, into the SD image information, according to a predetermined condition.

In particular, for example, when the CPU 111 executes the image information obtaining program 1133 and obtains HD image information from the various kinds of image apparatuses 2, the CPU 111 executes the sendable resolution determining program 1134. Subsequently, a condition (predetermined condition) of discriminating whether there is client terminal device 3 that connects display device 4 with screen resolution of SD, among the client terminal device 3, of which the wireless communication unit 14 has received the same request to send image information, according to the client identification number of the client terminal device 3 accepted by the wireless communication unit 14 and the client identification number stored in the screen/image data table 1131. Further, when the CPU 111 discriminates that there is client terminal device 3 that connects display device 4 with screen resolution of SD, among the client terminal device 3, of which the wireless communication unit 14 has received the same request to send image information, it is determined that the HD image information obtained by executing the image information obtaining program 1133 by the CPU 111 should be converted into the SD image information.

The CPU 111 performs as a determining section by executing the sendable resolution determining program 1134.

The image information sending program 1135 makes the CPU 111 actualize a performance to attach SD information as resolution information indicating that the resolution of the image information is SD, to the SD image information converted by the resolution conversion unit 12, and send the SD image information attached with the SD information to the client terminal device 3 accepted by the wireless communication unit 14.

In particular, within the execution of the sendable resolution determining program 1134 by the CPU 111, when it is determined that the HD image information obtained from execution of image information obtaining program 1133 by the CPU 111 should be converted into SD image information, the HD image information is converted into the SD image information by the resolution conversion unit 12. Subsequently, the CPU 111 executes the image information sending program 1135, attaches SD information to the SD image information converted by the resolution conversion unit 12, and sends the SD image information attached with the SD information from the wireless communication unit 14 to the wireless communication unit 32 (described later) of the client terminal device 3, of which the request to send image information was received by the wireless communication unit 14.

The CPU 111 performs as an image information sending section by executing the image information sending program 1135.

In case it is determined that the HD image information obtained from execution of the image information obtaining program 1133 by the CPU 111 should be converted into SD image information, by executing the sendable resolution determining program 1134 by the CPU 111, the resolution conversion unit 12 converts the HD image information obtained from execution of the image information obtaining program 1133 by the CPU 111 into SD image information as a server resolution conversion section, according to the control of the CPU 111.

In particular, for example, when it is discriminated that there is client terminal device 3 that connects display device 4 with screen resolution of SD, among the client terminal device 3, of which the wireless communication unit 14 has received the same request to send image information, the resolution conversion unit 12 converts the HD image information obtained by executing the image information obtaining program 1133 by the CPU 111 into the SD image information, according to the control from the CPU 111.

The encoder 13 encodes the image information inputted from the various kinds of image apparatuses 2 into compressed image information of a predetermined file form, and outputs the information.

In particular, for example, the encoder 13 encodes the image information inputted from the various kinds of image apparatuses 2 or the image information inputted from the various kinds of image apparatuses 2 and converted by resolution conversion unit 12, into compressed image information such as MPEG-2 (moving picture experts group phase 2).

The wireless communication unit 14 sends and receives various kinds of information with the client terminal device 3 through the wireless network N. In particular, the wireless communication unit 14 includes antenna 141 to conduct sending and receiving of radio signal with the client terminal device 3, RF (radio frequency) converter (not shown), wireless LAN card (not shown) to connect with wireless LAN that meets the standards of Bluetooth standard, IEEE 802.11 standard, and the like.

In particular, the wireless communication unit 14 of the present invention receives the request to send image information along with a client identification number of the client terminal device 3 from a wireless communication unit 32 (described later) of one or plurality of client terminal devices 3, as a receiving section. In addition, the wireless communication unit 14 of the present invention sends the SD image information attached with SD information to the wireless communication unit 32 (described later) of the client terminal device 3, as an image information sending section. Further, in case it is determined by executing the sendable resolution determining program 1134 by the CPU 111 that the HD image information obtained by executing the image information obtaining program 1133 by the CPU 111 should not be converted into SD image information, the wireless communication unit 14 of the present invention sends the HD image information to the wireless communication unit 32 (described later) of the client terminal device 3.

As shown in FIG. 2, the various kinds of image apparatuses 2 connected to the server device 1 includes television device 21 and the like, for example. The various kinds of image apparatuses 2 are operated in accordance with a control from the CPU 111 of the server device 1, such as control from CPU 111 that executed the image information obtaining program 1133, for example. The various kinds of image apparatuses 2, according to the control, outputs HD image information, corresponding to the request to send image information, to the server device 1 for example.

Here, the various kinds of image apparatuses 2 includes not only the television device 21, but also includes preferable arbitrary image apparatuses such as a video recorder, a personal video recorder (PVR), a tuner for broadcasting satellite (BS) and communication satellite (CS), a set top box (STB), a digital versatile disk (DVD) player, and the like, for example.

[Structure of the Client Terminal Device]

Figure 4:
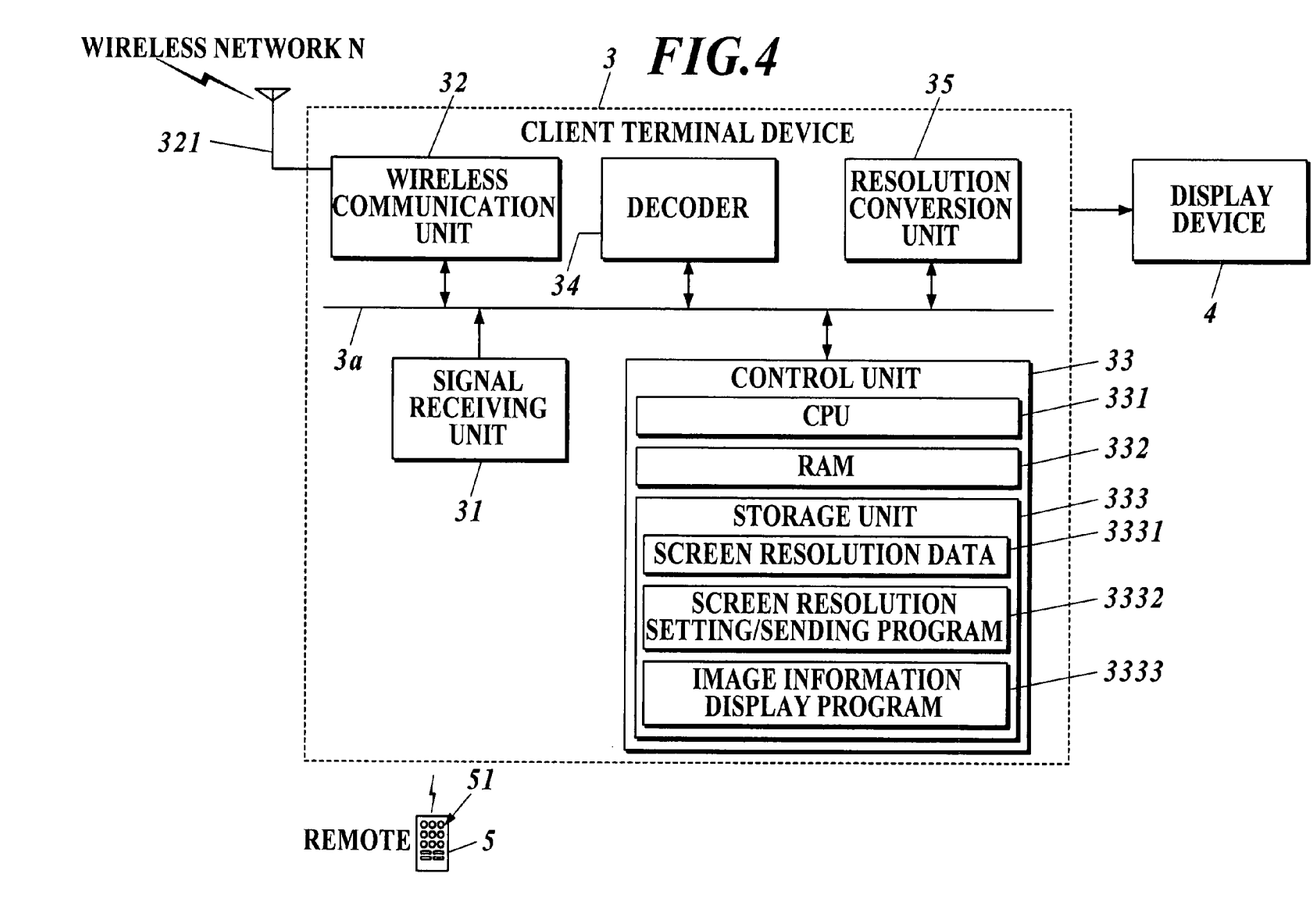
FIG. 4 is a block diagram showing a functional structure of a client terminal device according to the embodiment of the present invention.

As shown in FIG. 4, the client terminal device 3 is structured with a signal receiving unit 31, a wireless communication unit 32 as a screen resolution sending section, a control unit 33, a decoder 34, a resolution conversion unit 35 as a client resolution conversion-section, and the like. Each unit is connected through a bus 3A. Further, the client terminal device 3 is connected with the display device 4, and can be operated by a remote 5.

The signal receiving unit 31 receives various kinds of signals sent from the remote 5, for example.

The wireless communication unit 32 has a structure similar to the wireless communication unit 14 of the server device 1, and conducts sending and receiving of the various kinds of information with the server device 1 through the wireless network N. In particular, the wireless communication unit 32 includes antenna 321 to conduct sending and receiving of radio signal with the server device 1, RF (radio frequency) converter (not shown), wireless LAN card (not shown) to connect with wireless LAN that meets the standards of Bluetooth standard, IEEE 802.11 standard, and the like.

In particular, the wireless communication unit 32 of the present invention sends request to send image information to the wireless communication unit 14 of the server device 1, and receives image information corresponding to the request to send image information from the wireless communication unit 14 of the server device 1. Further for example, the wireless communication unit 32 of the present invention sends screen resolution of the display device 4 connected to the client terminal device 3 and a client identification number of the client terminal device 3 to the wireless communication unit 14 of the server device 1, as a screen resolution sending section.

As shown in FIG. 3, the control unit 33 includes CPU 331, RAM 332, storage unit 333, and the like, for example.

The CPU 331 conducts various kinds of control operations according to various kinds of processing programs for the client terminal device 3, stored in the storage unit 333.

The RAM 332 includes a program storage area to spread processing program executed by the CPU 331, and a data storage area to store inputted data and processing result generated when the aforementioned processing program is executed.

The storage unit 333 stores system program capable of being executed by the client terminal device 3, various kinds of processing programs capable of being executed by the system program, data used when these various kinds of processing programs are executed, data of processing result obtained from arithmetic processing by the CPU 331, and the like. Here, the programs are stored in the storage unit 333 in a form of program code which is readable by the computer.

In particular, as shown in FIG. 3, the storage unit 333 stores screen resolution data 3331, screen resolution setting/sending program 3332, image information display program 3333, and the like, for example.

The screen resolution data 3331 is screen resolution of the display device 4 connected to the client terminal device 3.

The screen resolution setting/sending program 3332 makes the CPU 331 actualize a performance to set the screen resolution of the display device 4 connected to the client terminal device 3, and send the screen resolution that was set and the client identification number of the client terminal device 3 to the server device 1.

In particular, in case the signal receiving unit 31 receives a signal relating to the screen resolution of the display device 4 from the remote 5, the CPU 331 executes the screen resolution setting/sending program 3332, sets the screen resolution of the display device 4 according to the signal, and stores the screen resolution that was set as the screen resolution data 3331 in the storage unit 333. Subsequently, the CPU 331 sends the set screen resolution and the client identification number of the client terminal device 3, from the wireless communication unit 32 to the wireless communication unit 14 of the server device 1.

The CPU 331 performs as a setting section and a screen resolution sending section by executing the screen resolution setting/sending program 3332.

The image information display program 3333 makes the CPU 331 actualize a performance to display the image information converted by the resolution conversion unit 35 in the display device 4.

In particular, when the SD image information attached with the SD information, sent from the wireless communication unit 14 of the server device 1, is converted according to the SD information by the resolution conversion unit 35 so as to comply with the screen resolution of the display device 4 connected to the client terminal device 3, the CPU 331 executes the image information display program 3333 and displays the converted image information in the display device 4.

The CPU 331 performs as a display control section by executing the image information display program 3333.

Here, the CPU 331 executes the image information display program 3333, and displays the image information sent from the wireless communication unit 14 of the server device 1, regardless of conversion by the resolution conversion unit 35.

The decoder 34, concerning the image information (compressed image information) sent from the wireless communication unit 14 of the server device 1, conducts processing in accordance with the file form of the compressed image information, and decodes the compressed image information into image information.

The resolution conversion unit 35, as a client resolution conversion section, converts the SD image information attached with the SD information, sent from the wireless communication unit 14 of the server device 1, so as to comply with the screen resolution of the display device 4 connected to the client terminal device 3, under the control of the CPU 331 according to the SD information.

In particular, in case the screen resolution of the display device 4 is HD, the resolution conversion unit 35 converts the SD image information attached with the SD information, sent from the wireless communication unit 14 of the server device 1, into HD image information in accordance with the SD information. Meantime, in case the screen resolution of the display device 4 is SD, the SD image information attached with the SD information, sent from the wireless communication unit 14 of the server device 1, is not converted in accordance with the SD information.

The display device 4 displays image information inputted from the client terminal device 3, according to the control of CPU 331 that executed the image information display program 3333, for example.

As shown in FIG. 4 for example, the remote 5 is provided with various kinds of input buttons 51. For example, in case any of the input button among the various kinds of input buttons 51 is depressed by a user, the remote 5 sends a signal corresponding to the input button to the signal receiving unit 31 of the client terminal device 3.

<Processing>

Next, processing relating to setting the screen resolution of the display device 4 connected to the client terminal device 3 ("processing of screen resolution setting of the display device"), and processing relating to resolution conversion of the image information displayed in the display device 4 connected to client terminal device 3 ("processing of resolution conversion of the image information"), at the client server system S are described.

[Processing of Screen Resolution Setting of the Display Device]

Figure 5:
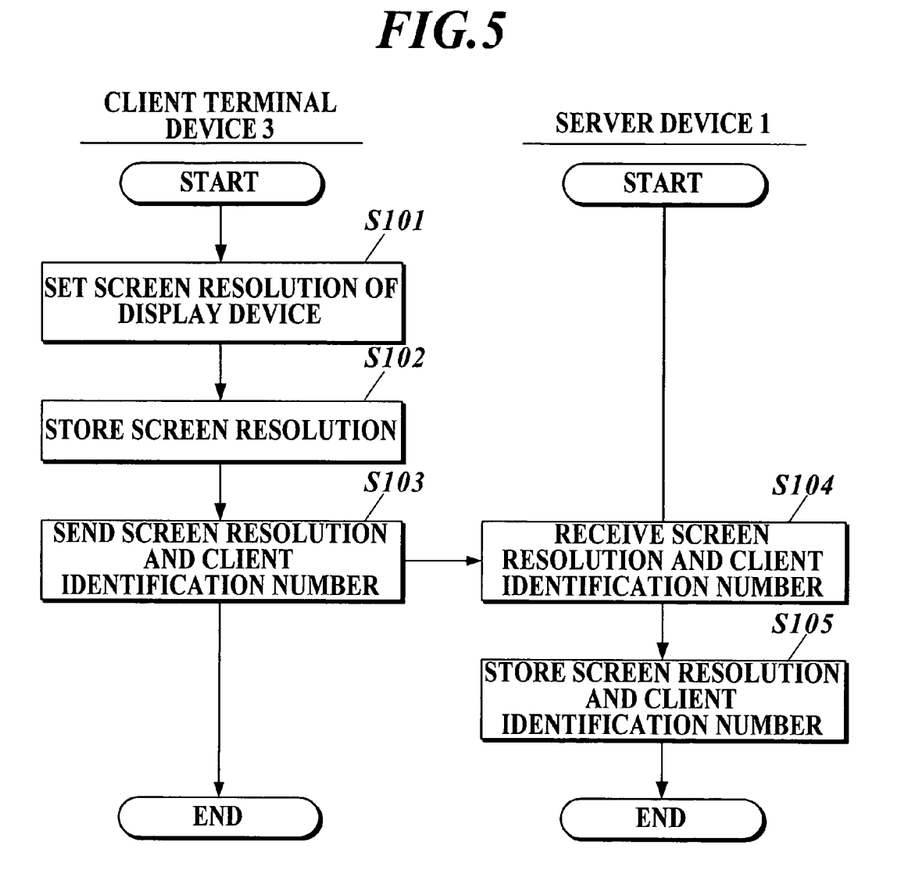
FIG. 5 is a flow chart to explain a processing relating to setting of screen resolution of a display device connected to the client terminal device, according to the client server system.

The processing relating to setting the screen resolution of the display device 4 connected to the client terminal device 3, at the client server system S is described with reference to flow chart of FIG. 5.

First of all, when the signal receiving unit 31 of the client terminal device 3 receives a signal relating to the screen resolution of the display device 4 from the remote 5, that is sent within a predetermined operation of the remote 5 by the user, the CPU 331 of the client terminal device 3 executes screen resolution setting/sending program 3332, and sets the screen resolution of the display device 4 in accordance with the signal received by the signal receiving unit 31 (step S101).

In particular, the screen resolution of the display device 4 connected to the client terminal device 3 with the client identification number of "15" is set to "HD", for example.

Next, the CPU 331 stores the screen resolution set at the step S101 as the screen resolution data 3331, into the storage unit 333 of the client terminal device 3 (step S102).

Subsequently, the CPU 331 sends the screen resolution set at the step S101 and the client identification number of the client terminal device 3, from the wireless communication unit 32 of the client terminal device 3 to the wireless communication unit 14 of the server device 1 (step S103).

Further, when the wireless communication unit 14 receives the screen resolution and the client identification number sent from the wireless communication unit 32 (step S104), the CPU 111 of the server device 1 executes the screen resolution storing program 1132. Thus, as shown in FIG. 3 for example, the received screen resolution ("HD", for example) and the received client identification number ("15", for example) are associated with each other, and stored in the "screen resolution" storing area 1131B and the "client identification number" storing area 1131A of the screen/image data table 1131 respectively (step S105), and the processing is completed.

[Processing of Resolution Conversion of the Image Information]

Figure 6:
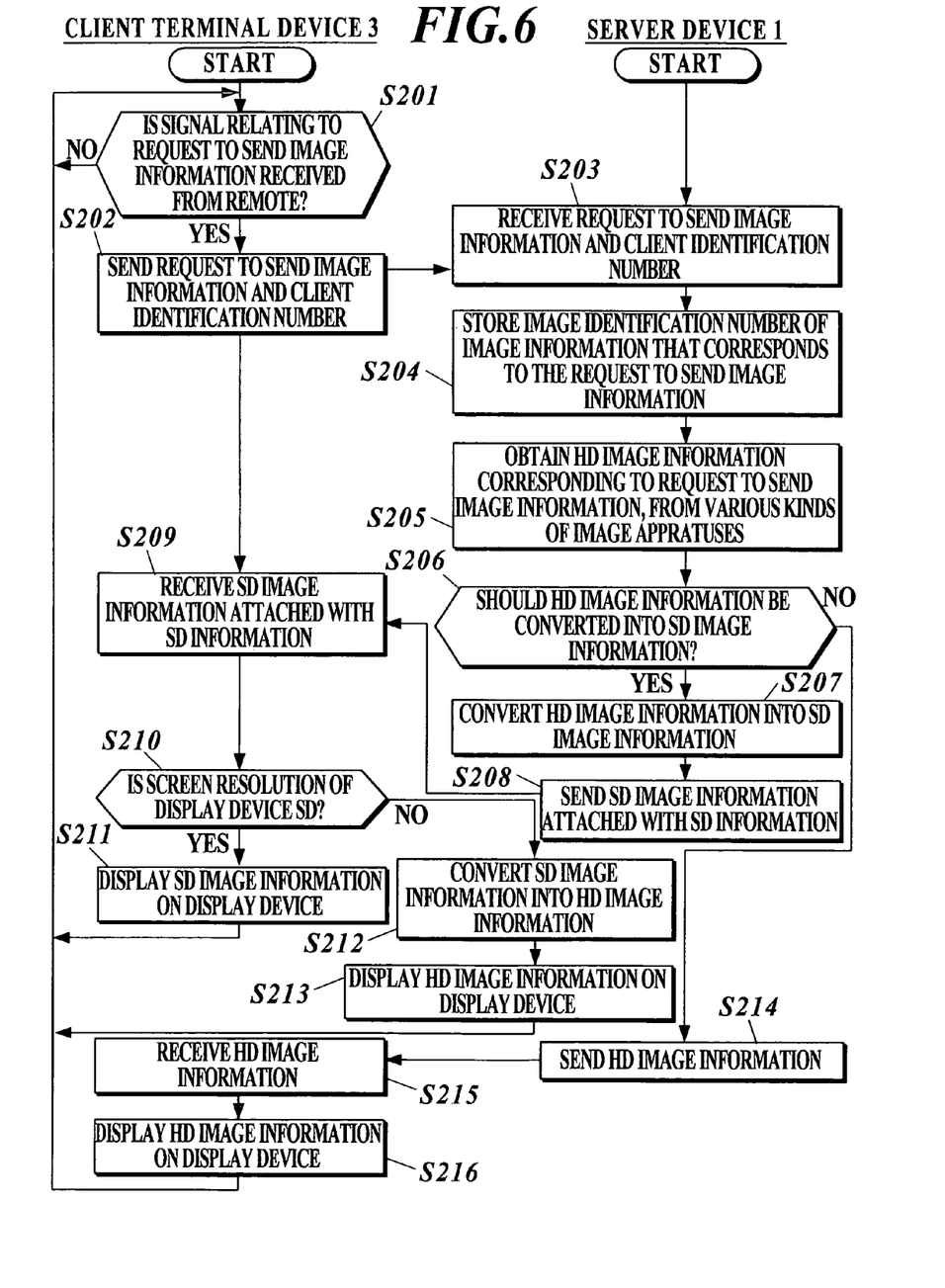
FIG. 6 is a flow chart to explain a processing relating to changing resolution of an image information which is to be displayed on the display device connected to the client terminal device, according to the client server system.

The processing relating to resolution conversion of the image information displayed in the display device 4 connected to client terminal device 3, at the client server system S, is described with reference to flow chart of FIG. 6.

First of all, the CPU 331 of the client terminal device 3 determines whether the signal receiving unit 31 has received a signal relating to the request to send image information, from the remote 5 (step S201).

In step S201, when it is determined that the signal receiving unit 31 has not received a signal relating to the request to send image information from the remote 5 (step S201; No), the CPU 331 repeats the processing of step S201.

Meantime, in step S201, when it is determined that the signal receiving unit 31 has received a signal relating to the request to send image information from the remote 5 (step S201; Yes), the CPU 331 sends the request to send image information according to the signal, and the client identification number of the client terminal device 3, from the wireless communication unit 32 of the client terminal device 3 to the wireless communication unit 14 of the server device 1 (step S202).

In particular, the request to send image information, with the image identification number of "28", is sent from the wireless communication unit 32 of the client terminal device 3, with the client identification number of "15", for example.

Next, when the wireless communication unit 14 receives and accepts the request to send image information and the client identification number sent from the wireless communication unit 32 (step S203), the CPU 111 of the server device 1 stores the image identification number ("28", for example) that corresponds to the accepted request to send image information, into the "image identification number" storing area 1131C, in association with the same client identification number as the accepted client identification number ("15", for example), among the client identification number stored in the "client identification number" storing area 1131A of the screen/image data table 1131 (step S204), as shown in FIG. 3 for example.

Subsequently, the CPU 111 executes the image information obtaining program 1133 and obtains HD image information corresponding to the request to send image information, accepted at step S203, from the various kinds of image apparatuses 2 (step S205).

Further, the CPU 111 executes the sendable resolution determining program 1134, and chooses the same image identification number as the image identification number ("28", for example) corresponding to the request to send image information accepted at step S203, from the "image identification number" storing area 1131C of the screen/image data table 1131. Then the screen resolution corresponding to the chosen image identification number is extracted from the "screen resolution" storing area 1131B of the screen/image data table 1131. Thus, it is discriminated whether there is "SD" in the extracted screen resolution, and it is determined whether or not to convert the HD image information obtained at step S205 into the SD image information (step S206).

In step S206, when it is discriminated that there is "SD" in the extracted screen resolution, and it is determined that the HD image information obtained at step S205 should be converted into SD image information (step S206; Yes), the CPU 111 makes the resolution conversion unit 12 convert the HD image information obtained at step S205 into SD image information (step S207).

In particular, in case of the screen/image data table 1131 of FIG. 3 for example, when the same image identification number as the image identification number ("28", for example) corresponding to the request to send image information accepted at step S203, from the "image identification number" storing area 1131C of the screen/image data table 1131 is chosen, the image identification number corresponding to the client identification numbers of "01", "08", "13", and "15" are chosen. Subsequently, when the screen resolution, corresponding to the chosen image identification number, is extracted from the "screen resolution" storing area 1131B of the screen/image data table 1131, "HD" (corresponding to client identification numbers of "01", "13", and "15") and "SD" (corresponding to client identification number of "08") are extracted. In this case, in step S206, the CPU 111 executes the sendable resolution determining program 1134, discriminates that there is "SD" in the extracted screen resolution, and determines that the HD image information obtained at step S205 should be converted into SD image information.

Subsequently, the CPU 111 executes the image information sending program 1135, encodes the SD image information converted at step S207 by the encoder 13, attaches SD information to the encoded SD image information, and sends the SD image information attached with the SD information from the wireless communication unit 14 to the wireless communication unit 32 of the client terminal device 3 (step S208).

In particular, the SD image information attached with the SD information (image identification number "28", for example) is sent to the client terminal device 3 with the client identification numbers of "01", "08", "13", and "15".

Next, when the wireless communication unit 32 receives the SD image information attached with the SD information that is sent from the wireless communication unit 14 (step S209), the CPU 331 of the client terminal device 3 determines whether the screen resolution of the display device 4 connected to the client terminal device 3 is SD or not, according to the screen resolution data 3331 stored in the storage unit 333 of the client terminal device 3 (step S210).

In step S210, when it is determined that the screen resolution of the display device 4 connected to the client terminal device 3 is SD (step S210; Yes), the CPU 331 makes the decoder 34 decode the SD image information received at step S209, executes image information display program 3333, and displays the decoded SD image information in the display device 4 (step S211). The CPU 331 repeats the processing of step S201 thereafter.

In particular, since the screen resolution of the display device 4 connected to the client terminal device 3 with the client identification number of "08" is SD (refer to FIG. 3), the SD image information received at step S209 is displayed in the display device 4 at step S211.

Meantime, in step S210, when it is determined that the screen resolution of the display device 4 connected to the client terminal device 3 is not SD (step S210; No), the CPU 331 makes the decoder 34 decode the SD image information received at step S209, and makes the resolution conversion unit 35 convert the decoded SD image information into HD image information (step S212).

Subsequently, the CPU 331 executes the image information display program 3333 and displays the HD image information converted at step S212, in the display device 4 (step S213). The CPU 331 repeats the processing of step S201 thereafter.

In particular, since the screen resolution of the display device 4 connected to the client terminal device with the client identification numbers of "01", "13", and "15" are HD and not SD (refer to FIG. 3), the SD image information received at step S209 is displayed in the display device 4 at step S213 after being converted into HD image information at step S212.

Meantime, in step S206, when it is discriminated that "SD" is not in the extracted screen resolution, and it is determined that the HD image information obtained at step S205 should not be converted into SD image information (step S206; No), the CPU 111 encodes the HD image information obtained at step S205 by the encoder 13, and sends the encoded HD image information from the wireless communication unit 14 to the wireless communication unit 32 of the client terminal device 3 (step S214).

Subsequently, when the wireless communication unit 32 receives the HD image information sent from the wireless communication unit 14 (step S215), the CPU 331 makes the decoder 34 decode the HD image information received at step S215, executes image information display program 3333, and displays the decoded HD image information in the display device 4 (step S216). The CPU 331 repeats the processing of step S201 thereafter.

According to the client server system S of the present invention as described above, the screen resolution of the display device 4 connected to the client terminal device 3 can be stored in association with the client identification number to identify the client terminal device 3, by the screen/image data table 1131. By executing the sendable resolution determining program 1134 by the CPU 111, it can be discriminated whether there is client terminal device 3 that connects display device 4 with screen resolution of SD, among the client terminal device 3 of which the wireless communication unit 14 has received the same request to send image information, according to the client identification number of the client terminal device 3 accepted by the wireless communication unit 14 and the client identification number stored in the screen/image data table 1131. It can also be determined whether the HD image information obtained by executing the image information obtaining program 1133 by the CPU 111, should be converted into SD image information or not. By executing the sendable resolution determining program 1134 by the CPU 111, when it is identified that there is client terminal device 3 that connects display device 4 with screen resolution of SD, among the client terminal device 3 of which the wireless communication unit 14 has received the same request to send image information, and it is determined that the HD image information should be converted into SD image information, the HD image information obtained by executing the image information obtaining program 1133 by the CPU 111 can be converted into SD image information by the resolution conversion unit 12.

That is, the server device 1 can determine the resolution of the image information which is to be sent to the client terminal device 3, taking in account the screen resolution of display device 4 connected to the client terminal device 3. Meantime, the resolution conversion unit provided at the server device 1 is only the resolution conversion unit 12 that converts the HD image information into the SD image information. Therefore, the decrease in image quality displayed in the display device 4 can be kept to minimum, and the cost of the server device 1 can be suppressed.

In addition, by executing the image information sending program 1135 by the CPU 111, the SD information, which indicates that the resolution of the image information is SD, can be attached to the SD image information converted by the resolution conversion unit 12. Therefore, the SD image information attached with the SD information can be sent from the wireless communication unit 14 to the wireless communication unit 32 of the client terminal device 3, of which the wireless communication unit 14 received the request to send image information. Thus the resolution conversion unit 35 provided to the client terminal device 3 can convert the SD image information attached with the SD information so as to comply with the screen resolution of the display device 4 connected to the client terminal device 3, according to the SD information.

That is, the client terminal device 3 can recognize the resolution of the image information according to the SD information sent from the server device 1. In particular, the client terminal device 3 can recognize image information attached with the SD information as the SD image information, and can recognize image information that is not attached with the SD information as the HD image information, among the image information sent from the server device 1. Therefore, the client terminal device 3 does not have to check the resolution of the image information sent from the server device 1, thus excellent efficiency is achieved.

In addition, since the resolution of the image information sent from the server device 1 can be adjusted to the screen resolution of the display device 4 at the client terminal device 3 before the image information is inputted to the display device 4, a person observing the display device 4 would not have an uncomfortable feeling.

Further, the screen resolution of the display device 4 connected to the client terminal device 3 can be set, and the screen resolution that is set and the client identification number of the client terminal device 3 can be sent from the wireless communication unit 32 to the wireless communication unit 14 of the server device 1, by executing the screen resolution setting/sending program 3332 by the CPU 331. The screen resolution that was sent can be stored in the screen/image data table 1131 in association with the client identification number by executing the screen resolution storing program 1132 by the CPU 111.

That is, since the server device 1 can take hold of the screen resolution of the display device 4 connected to the client terminal device 3 as needed, the screen resolution of the display device 4 connected to the client terminal device 3 can be taken into account appropriately.

Here, the present invention is not limited to the aforementioned embodiment, and can be modified so far as it does not deviate the scope of the present invention.

For example, the CPU 111, as the predetermined condition, may not only discriminate whether there is client terminal device 3 that connects display device 4 with screen resolution of SD, among the client terminal device 3, of which the wireless communication unit 14 has received the same request to send image information, and determine whether the HD image information should be converted into the SD image information. It may also determine whether the HD image information should be converted into the SD image information according to the conditions of image information sending rate, the number of client terminal device 3 to which the sever device 1 sends the image information, or the like, as the predetermined condition. In addition, a plurality of these conditions may be combined to make determination.

What is claimed is:

1. A client server system comprising:
a server device which provides image information to a plurality of client terminal devices through a wireless network, the server device comprising:
a storage section to store a screen resolution of display devices connected to the plurality of client terminal devices in association with identification information to identify the plurality of client terminal devices;
a storage control section to store the screen resolution and the identification information sent from the plurality of client terminal devices in the storage section in association with each other;
a receiving section to receive the identification information of the plurality of client terminal devices along with a request to send the same image information from at least one of the plurality of client terminal devices;
an obtaining section to obtain first image information of a first resolution corresponding to the request to send image information received at the receiving section;
a determining section to determine whether there is a client terminal device which connects a display device with a second resolution, among the at least one of the plurality of client terminal devices from which the request was received by the receiving section, according to the identification information of the at least one of the plurality of client terminal devices received by the receiving section and the identification information stored in the storage section;
a server resolution conversion section to convert the first image information of the first resolution obtained by the obtaining section into second image information of the second resolution, in case it is determined that there is a client terminal device which connects a display device with the second resolution, among the at least one of the plurality of client terminal devices from which the request was received by the receiving section, according to the determining section; and
an image information sending section to attach resolution information that indicates that the resolution of the second image information is the second resolution to the second image information of the second resolution that was converted by the server resolution conversion section, and to send the resolution information and the second image information to the at least one of the plurality of client terminal devices,
wherein the plurality of client terminal devices comprise:
a setting section to set a screen resolution of the display devices connected to the plurality of client terminal devices;
a screen resolution sending section to send the screen resolution set by the setting section and identification information of the plurality of client terminal devices to the server device;
a client resolution conversion section to convert the second image information attached with the resolution information that was sent from the image information sending section, so as to comply with the screen resolution of the display device connected to the plurality of client terminal devices, according to the resolution information; and
a display control section to display an image information converted by the client resolution conversion section on the display device,
wherein the plurality of client terminal devices are capable to connect with a first display device with a screen resolution of the first resolution, or a second display device with a screen resolution of the second resolution, which has a lower resolution than the first resolution.

2. A client server system comprising:
a server device which provides image information to a plurality of client terminal devices through a wireless network, the server device comprising:
a receiving section to receive the identification information of the plurality of client terminal devices along with a request to send the same image information from at least one of the plurality of client terminal devices;
an obtaining section to obtain first image information of a first resolution corresponding to the request to send image information received at the receiving section;
a determining section to determine whether the first image information of the first resolution obtained by the obtaining section should be converted into second image information of a second resolution;
a server resolution conversion section to convert the first image information of the first resolution obtained by the obtaining section into second image information of the second resolution, in case it is determined that the first image information of the first resolution obtained by the obtaining section should be converted into second image information of the second resolution according to the determining section; and
an image information sending section to attach resolution information that indicates that the resolution of the second image information is the second resolution to the second image information of the second resolution that was converted by the server resolution conversion section, and to send the resolution information and the second image information to the at least one of the plurality of client terminal devices,
wherein the plurality of client terminal devices comprise:
a client resolution conversion section to convert the second image information attached with the resolution information that was sent from the image information sending section, so as to comply with the screen resolution of the display device connected to the plurality of client terminal devices, according to the resolution information; and
a display control section to display an image information converted by the client resolution conversion section on the display device,
wherein the plurality of client terminal devices are capable to connect with a first display device with a screen resolution of the first resolution, or a second display device with a screen resolution of the second resolution, which has a lower resolution than the first resolution.

3. The client server system as claimed in claim 2, wherein the server device further comprises:
a storage section to store a screen resolution of display devices connected to the plurality of client terminal devices in association with identification information to identify the plurality of client terminal devices, and
wherein the second determining section:
determines whether there is a client terminal device which connects a display device with a screen resolution of the second resolution, among the at least one of the plurality of client terminal devices from which the request was received by the receiving section, according to the identification information of the at least one of the plurality of client terminal devices received by the receiving section and the identification information stored in the storage section; and
determines that the first image information of the first resolution obtained by the obtaining section should be converted into second image information of the second resolution, in case it is determined that there is a client terminal device which connects a display device with the second resolution, among the at least one of the plurality of client terminal devices from which the request was received by the receiving section, according to the determining section.

* * * * *